United States Patent
Bernatschek

[15] 3,696,844
[45] Oct. 10, 1972

[54] BRAKING SHUTTLE BOX

[72] Inventor: Adolf Oswald Bernatschek, Hochkreuzweg 2, CH-9320 Arbon/TG, Switzerland

[22] Filed: Nov. 4, 1969

[21] Appl. No.: 873,995

[30] Foreign Application Priority Data

Nov. 5, 1968   Switzerland............16483/68

[52] U.S. Cl. .................................................139/186
[51] Int. Cl. ............................................D03d 49/54
[58] Field of Search.............................139/185–187

[56] References Cited

UNITED STATES PATENTS

| | | | |
|---|---|---|---|
| 270,228 | 1/1883 | Kothe | 139/185 |
| 404,649 | 6/1889 | Noiseux | 139/185 |
| 1,232,262 | 7/1917 | Field | 139/186 |
| 2,057,114 | 10/1936 | Rossmann | 139/185 |
| 3,429,345 | 2/1969 | O'Donnell | 139/186 |

FOREIGN PATENTS OR APPLICATIONS

| | | |
|---|---|---|
| 385,250 | 12/1932 | Great Britain............139/185 |
| 606,068 | 8/1948 | Great Britain............139/187 |
| 949,349 | 2/1964 | Great Britain............139/186 |

*Primary Examiner*—James Kee Chi
*Attorney*—Michael S. Striker

[57] ABSTRACT

A braking shuttle box has a fixed brake wall and a leaf spring opposite the brake wall forming with the same a brake channel for a shuttle. First energy absorbing means having high mass and inertia and second energy absorbing means having low mass and inertia are provided on the outer side of the leaf spring and urge the same toward and into the brake channel so that a shuttle entering the brake channel and engaging the leaf spring transfers energy to the mass of the first energy absorbing means while the leaf spring is biassed into sliding engagement with the shuttle by the second energy absorbing means so that the shuttle is braked in the brake channel.

9 Claims, 1 Drawing Figure

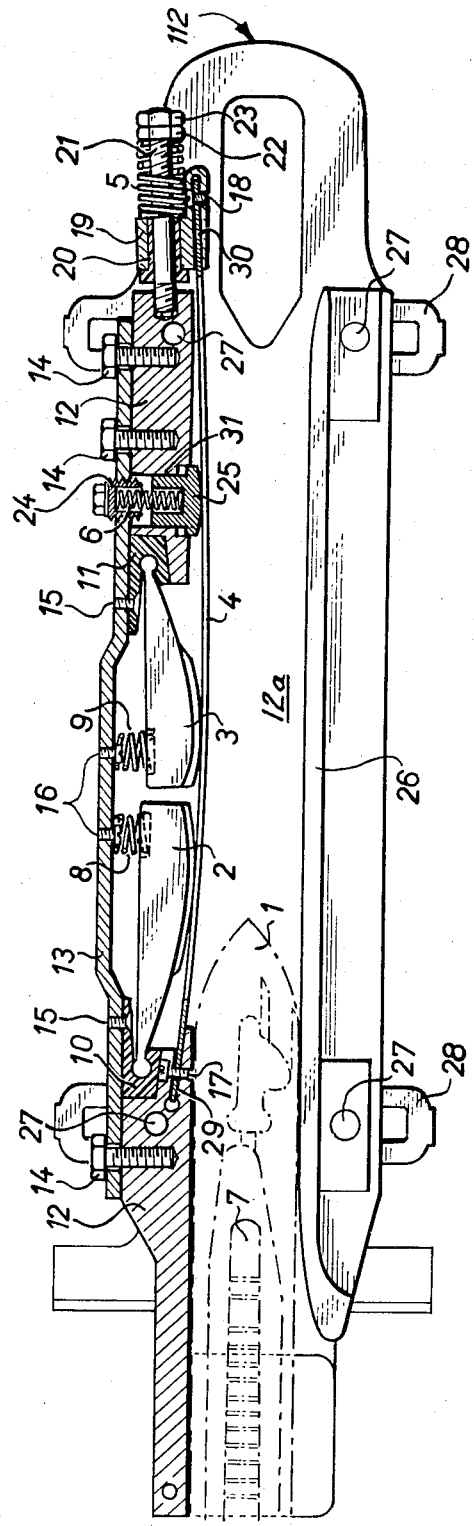
INVENTOR.
ADOLF OSWALD BERNATSCHEK

3,696,844

BRAKING SHUTTLE BOX

BACKGROUND OF THE INVENTION

It is known to provide a shuttle box with a fixed brake wall and with a resilient pressure means which urges the entering shuttle against the brake wall. The arrangement has the disadvantage that the comparatively heavy resilient pressure means begins to oscillate under the impact of the shuttle, and alternately engages and disengages the shuttle so that the braking of the same is not continuous. The brake lining of the resilient pressure means is worn off after prolonged use and loses its braking effect so that the insufficiently braked shuttle hits the picking means, which serve as a stop for the shuttle, at a comparatively high speed and bounces back. As a result, the end position of the brake shuttle is not exactly the same for every pick, which has disadvantages particularly when the bobbin is exchanged. Furthermore, the wear of the shuttle and of the picking means is high.

SUMMARY OF THE INVENTION

It is one object of the invention to overcome the disadvantages of braking shuttle boxes, and to provide a braking shuttle box in which the entering shuttle is continuously braked, so that it can be stopped without bouncing back.

Another object of the invention is to provide a braking shuttle box in which the shuttle is always stopped in the same end position.

Another object of the invention is to continuously guide the shuttle in the shuttle box, and to reduce the friction to which the shuttle is subjected in the shuttle box when entering and leaving the same.

With these objects in view, the present invention provides instead of the resilient wall of the prior art, a resilient band which is urged into the path of the shuttle by at least one resiliently mounted body having high mass, and by at least one resilient body having low mass. Preferably, the depth which the metal band enters into the path of the shuttle, is adjustable.

One embodiment of the invention comprises a supporting body including a brake wall; a leaf spring means mounted on the supporting body opposite the brake wall and forming with the same a brake channel for a shuttle; and first and second energy absorbing means mounted in the supporting body on the side of the leaf spring means remote from the brake channel resiliently abutting the leaf spring means for urging the same into the brake channel.

The first energy absorbing means have substantial mass and inertia and the second energy absorbing means have low mass and inertia. As a result, a shuttle entering the brake channel and engaging the leaf spring means, transfers energy to the first energy absorbing means through the leaf spring means, while the same is biassed into sliding engagement with the shuttle by the second energy absorbing means.

In the preferred embodiment of the invention, the end of the leaf spring means adjacent the inlet of the brake channel is fixedly secured to the supporting body, while the other end of the leaf spring means is movably secured to the supporting body, and provided with adjusting means by which longitudinal pressure can be exerted on the leaf spring means for adjusting the distance of the central part of the same from the brake wall.

The first energy absorbing means, which have a great mass and inertia, are mounted on the supporting body of the shuttle box closer to the inlet of the braking channel than the second energy absorbing means which has low mass and inertia.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

BRIEF DESCRIPTION OF THE DRAWING

The single FIGURE of the drawing is a longitudinal sectional view of a braking shuttle box according to the invention.

DESCRIPTION OF THE PREFERRED EMBODIMENT

A shuttle 1 carrying a bobbin 7 is shown in dash and dot lines at the moment in which shuttle 1 enters the inlet of the braking channel 12a of a shuttle box 112. One side of the braking channel 12a is bounded by a fixed braking wall 26, while the other side of the brake channel 12a is partly bounded by a leaf spring 4. The end of leaf spring 4 adjacent the inlet of brake channel 12a is inserted into a matching slot 29 in the supporting body 12, and secured by screw 17.

The other end of leaf spring 4 is inserted into a slot 30 in a slide member 19, and secured to the same by a screw 18. Slide member 19 has a sleeve 20 slidably mounted on a guide pin 21 which is threaded into a bore of supporting body 12. A loading spring 5 is also mounted on guide pin 21 abutting a pair of adjusting nuts 22 and 23 by which the pressure of loading spring 5, which acts through slide member 19, 20 on leaf spring 4, can be manually adjusted. The counter nut 23 secures the adjusting nut 22 in the adjusted position of spring 5. Slide member 19, 20 of the adjustable mounting means 18–23 exerts on leaf spring 4 a longitudinal buckling pressure.

First energy absorbing means including two movable bodies 2 and 3, and springs 8 and 9 are provided on the side of the leaf spring 4 remote from brake channel 12a. The members 2 and 3 have substantial mass and inertia, and are mounted at the thinner ends thereof in bearings 10 and 11 for pivotal movement. The shuttle box 112 has a rear wall 13 secured by screws 14 to supporting body 12. Bearings 10 and 11 are attached by screws 15 to the rear wall 13.

Springs 8 and 9 abut the inner surface of rear wall 13, and are held in position by a pair of screws 16 whose heads are surrounded by the coil springs 8 and 9. The other ends of the coil springs 8, 9 are located in recesses of members 2 and 3 so that the same can perform a pivotal movement while being urged into engagement with the outer surface of leaf spring 4 by springs 8 and 9.

A second energy absorbing means includes a spring 6, and a light energy absorbing abutment member 25 guided in a guideway 31 of supporting body 12 for movement in a direction transverse to leaf spring 4, abutting the same. A hollow adjusting screw 24 receives one end of spring 6 whose other end is located in a corresponding recess in abutment member 25. When screw 24 is turned, the resilient force by which abutment member 25 is pressed against the outer surface of leaf spring is adjusted. The entire shuttle box 112 is secured by screws, not shown, passing through bores 27 in supporting body 12, and through slots in brackets 28 carried by the frame of the loom, not shown.

OPERATION

A shuttle 12, picked from the other side of the loom through a warp shed, enters with its conical head leading into the inlet of the brake channel 12a in the position illustrated in the drawing. During further movement, shuttle 1 engages the central portion of leaf spring 4 which is urged by first energy absorbing means 2, 3, 8, 9, the second energy absorbing means 6, 25, and mounting means 18-23 to assume a bent shape convex toward brake channel 12a and slightly projecting into the same. The thus deformed leaf spring 4 produces a resilient force acting against members 2 and 3.

Upon the impact of shuttle 1 on leaf spring 4, energy absorbing bodies or members 2 and 3 are thrown toward the rear wall 13 while springs 8 and 9 are compressed to gradually slow down, and stop the members 2 and 3. A part of kinetic energy of shuttle 1 is transferred through leaf spring 4 to the comparatively heavy bodies 2 and 3 so that the shuttle is slowed down while remaining in contact with leaf spring 4 which is still urged into brake channel 12a by means 25, 16.

By suitably chosing the mass and weight of members 2 and 3, and the distances which the same are permitted to move, the kinetic energy of shuttle 1, and its speed, are substantially reduced, and the remaining energy of the shuttle is consumed by compressing spring 6 which acts on the low mass abutment member 25 so that the shuttle approaches the picking means, not shown, at a very low speed, and does not bounce back from the same which would require another deformation of spring 6.

The distance which the central convex portion of leaf spring 4 projects into the brake channel 12a, is adjusted by manually operating adjusting nut 22 and counter nut 23, and this adjustment adapts the shuttle box for use with shuttles of different weight. A fine adjustment can be effected by adjusting screw 24 by which the force of spring 6 acting on leaf spring 4 can be adjusted.

Due to the low mass of leaf spring 4, which results in a high self oscillation frequency of the same, leaf spring 4 does not separate from shuttle 1 while braking the same in the brake channel so that a continuous and efficient guidance of the shuttle is assured.

The construction of the present invention permits it to place the point at which leaf spring 4 is first engaged by the entering shuttle, and last engaged by the leaving shuttle, near the inlet of the brake channel. As a result, the shuttle is pressed for a greater period of time against the fixed braking wall 26, than is possible in constructions of the prior art.

It will be understood that each of the elements described above, or two or more together, may also find a useful application in other types of braking shuttle boxes differing from the thpes described above.

While the invention has been illustrated and described as embodied in a braking shuttle box with a leaf spring urged into the brake channel by two pressure means having great and small masses, respectively, it is not intended to be limited to the details shown, since various modifications and structural changes may be made without departing in any way from the spirit of the present invention.

What is claimed as new and desired to be protected by Letters Patent is set forth in the appended claims.

1. Braking shuttle box comprising a supporting body including a brake wall; leaf spring means located opposite said brake wall and forming with the same a brake channel having an inlet for a shuttle; mounting means mounting the ends of said leaf spring means in said supporting body so that said leaf spring means is curved and convex toward said brake wall; first and second energy absorbing means mounted in said supporting body on the side of said leaf spring means remote from said brake channel, said first energy absorbing means being closer to said inlet than said second energy absorbing means, said first energy absorbing means including first movable body means having great mass and inertia, and first spring means biasing said first movable body means into engagement with said leaf spring means for urging the same into said brake channel, and said second energy absorbing means including second movable body means having small mass and inertia, and second spring means mounted in said supporting body and biasing said second movable body means into engagement with said leaf spring means so that a shuttle entering said brake channel through said inlet transfers kinetic energy through said leaf spring means to said first movable body means so that the same is thrown away from said leaf spring means and compresses said first spring means which absorbs energy, whereupon kinetic energy remaining in said shuttle is transmitted through said leaf spring means and said second movable body means to said second spring means and absorbed by the same.

2. Braking shuttle box as claimed in claim 1 including means for fixedly securing one end of said leaf spring means to said supporting body, and adjusting means connected with the other end of said leaf spring means for adjusting the distance of the central part of said leaf spring means from said brake wall and thereby the width of said channel.

3. Braking shuttle box as claimed in claim 2 wherein said adjusting means include a loading spring engaging said other end of said leaf spring means and biasing said other end toward said one end so that said leaf spring means has a convex shape toward said brake channel, and manually operable means for adjusting the pressure of said loading spring supported on said supporting body and projecting outward from the same.

4. Braking shuttle box as claimed in claim 1 wherein said second energy absorbing means includes an adjusting member having a manually operable part projecting out of said supporting body and being adjustable for varying the resilient pressure exerted by said second spring means on said leaf spring means.

5. Braking shuttle box as claimed in claim 1 wherein said brake channel has said inlet for the shuttle at one end; wherein one end of said leaf spring means is fixedly secured to said supporting body adjacent said inlet, and the other end of said leaf spring means is movably supported on said supporting body adjacent the other end of said brake channel.

6. Braking shuttle as claimed in claim 1 wherein said first movable body means include two movable bodies having great mass and inertia and being mounted on said supporting body for pivotal movement toward and away from said leaf spring means, and wherein said first spring means include two springs abutting said supporting body and said movable bodies for urging the latter against two portions of said leaf spring means spaced in the direction of said brake channel.

7. Braking shuttle box as claimed in claim 6, wherein said two movable bodies have thin end portions pivotally supported on said supporting body, and thick end portions located adjacent each other and abutting said portions of said leaf spring means, respectively; and wherein said two springs abut said thick portions of said movable bodies, respectively.

8. Braking shuttle box as claimed in claim 6 wherein said supporting body has a guideway transverse to said leaf spring means; wherein said second movable body means includes a light abutment member abutting said leaf spring means and guided in said guideway, and wherein said second spring means includes a coil spring located in said guideway and biasing said abutment member toward said leaf spring means; and means for adjusting said coil spring.

9. Braking shuttle as claimed in claim 1 wherein mounting means include adjustable spring exerting variable longitudinal force on said leaf spring means.

* * * * *